(12) United States Patent
Butler

(10) Patent No.: US 10,147,333 B2
(45) Date of Patent: *Dec. 4, 2018

(54) VIDEO MANAGEMENT SYSTEM FOR INTERACTIVE ONLINE INSTRUCTION

(71) Applicant: ArtistWorks, Inc., Napa, CA (US)

(72) Inventor: David A. Butler, Napa, CA (US)

(73) Assignee: ArtistWorks, Inc., Napa, CA (US)

( * ) Notice: Subject to any disclaimer, the term of this patent is extended or adjusted under 35 U.S.C. 154(b) by 424 days.

This patent is subject to a terminal disclaimer.

(21) Appl. No.: 14/885,789

(22) Filed: Oct. 16, 2015

(65) Prior Publication Data

US 2016/0035232 A1 Feb. 4, 2016

Related U.S. Application Data

(63) Continuation of application No. 12/237,263, filed on Sep. 24, 2008, now Pat. No. 9,165,473.

(Continued)

(51) Int. Cl.
*G09B 7/00* (2006.01)
*G09B 5/06* (2006.01)
(Continued)

(52) U.S. Cl.
CPC ......... *G09B 5/065* (2013.01); *G06F 17/3082* (2013.01); *G06F 17/3084* (2013.01);
(Continued)

(58) Field of Classification Search
CPC . G09B 5/00; G09B 5/02; G09B 15/04; G09B 15/00; G09B 5/065; G09B 5/14; G09B 5/06; G06F 17/3084; G06F 17/3082; G06F 17/30823; G06Q 10/10; H04L 67/02

(Continued)

(56) References Cited

U.S. PATENT DOCUMENTS 5,530,754 A 6/1996 Garfinkle
5,987,302 A * 11/1999 Driscoll ............... G09B 5/065
382/321

(Continued)

OTHER PUBLICATIONS

Applet SDK (http://www.softpedia.com/get/Programming/SDK-DDK/Video-Recordi-ng-Applet-SDK.shtml), last updated Nov. 22, 2007.

(Continued)

*Primary Examiner* — Michael Grant
(74) *Attorney, Agent, or Firm* — Santa Fe IP, LLC

(57) ABSTRACT

A system for interactive online instruction includes an instructional subscription website and video management system configured to process video recordings. The video recordings may include (i) student videos uploaded by a student and (ii) instructor videos providing feedback to said student videos. A method of interactive online instruction is also disclosed. The method includes the steps of providing prerecorded course materials on an instructional subscription website including video lessons accessible by subscribing students, and providing a video management system configured to process video recordings including (i) student videos submitted by a student and (ii) instructor videos providing feedback to said student videos.

12 Claims, 7 Drawing Sheets

Related U.S. Application Data

(60) Provisional application No. 61/083,902, filed on Jul. 25, 2008.

(51) Int. Cl.
    *H04L 29/08*     (2006.01)
    *G06F 17/30*     (2006.01)
    *G06Q 10/10*     (2012.01)
    *G09B 5/14*      (2006.01)
    *G09B 15/00*     (2006.01)
    *G09B 5/02*      (2006.01)
    *G09B 15/04*     (2006.01)
    *G09B 5/00*      (2006.01)

(52) U.S. Cl.
    CPC ....... *G06F 17/30823* (2013.01); *G06Q 10/10* (2013.01); *G09B 5/06* (2013.01); *G09B 5/14* (2013.01); *G09B 15/00* (2013.01); *H04L 67/02* (2013.01); *G09B 5/00* (2013.01); *G09B 5/02* (2013.01); *G09B 15/04* (2013.01)

(58) Field of Classification Search
    USPC .......................................... 434/323
    See application file for complete search history.

(56) References Cited

U.S. PATENT DOCUMENTS

| | | |
|---|---|---|
| 6,072,113 A | 6/2000 | Tohgi et al. |
| 6,296,489 B1 | 10/2001 | Blass et al. |
| 7,332,664 B2 | 2/2008 | Yung |
| 7,930,300 B2 | 4/2011 | Colbran |
| 9,165,473 B2 | 10/2015 | Butler |
| 2001/0036620 A1 | 11/2001 | Peer et al. |
| 2002/0157521 A1 | 10/2002 | Shahal |
| 2003/0036046 A1 | 2/2003 | Smolover |
| 2004/0002048 A1 | 1/2004 | Thurmaier et al. |
| 2004/0139233 A1 | 7/2004 | Kellerman et al. |
| 2006/0003300 A1* | 1/2006 | Davis ............... A63B 24/0003 434/247 |
| 2006/0161635 A1 | 7/2006 | Lamkin et al. |
| 2006/0254404 A1 | 11/2006 | Bryant et al. |
| 2007/0009872 A1 | 1/2007 | Sonsteng et al. |
| 2007/0026958 A1* | 2/2007 | Barasch ........... A63B 24/0003 473/266 |
| 2007/0031805 A1* | 2/2007 | Fox .................... G09B 5/06 434/350 |
| 2007/0087319 A1 | 4/2007 | Roberts et al. |
| 2007/0134640 A1 | 6/2007 | Masaoka |
| 2007/0143130 A1* | 6/2007 | Hearn ................. G06Q 10/10 386/326 |
| 2007/0189708 A1* | 8/2007 | Lerman .............. G11B 27/034 386/280 |
| 2008/0041218 A1 | 2/2008 | Hara et al. |
| 2008/0090219 A1 | 4/2008 | Wilson et al. |
| 2009/0099983 A1 | 4/2009 | Drane et al. |
| 2010/0287473 A1 | 11/2010 | Recesso et al. |

OTHER PUBLICATIONS

U.S. Appl. No. 15/253,739, filed Aug. 31, 2016.
U.S. Appl. No. 12/237,263 filed Sep. 24, 2008.

* cited by examiner

Video Submission Page

Guitar Institute

Video Submission Page

Use this page to send your video to Instructor. He/she will watch your video, assess your progress, and respond in a personalized Master Class which will be posted soon. In the Master Class, his/her response and feedback will be in a personalized video, a written assessment, or both.

Enter a Title for your video: [The Five Shapes in All Keys]
Any additional information you'd like to give? [I tried to do it better this time based on what you told me last time.]

Choose Video's Category [Five Shapes]
Video File: [Choose File] no file selected
[Upload Video]

*FIG. 2*   — 39

Master Class Roster

07/07/2008
- Student A plays bass lines.
- Student A plays Midnight Blue.

07/03/2008
- John plays the 5 shapes.
- Paul plays Song One
- George plays Song Two
- Ringo plays over a II-V-I in Eb
- Student X plays the 5 shapes.
- Student Y plays over a II-V-I in C minor.

*FIG. 3*

| Five Shapes | Tune Analysis | Student Tunes | Chord Progression Improv | Questions for Jimmy | Improv Level 3 |

MISTY

| | Student Name | Date Posted | Description |
|---|---|---|---|
| SC | Student1 | 04/04/2008 | Student1 Plays Over "Misty" |
| SC | Student2 | 04/04/2008 | Student2 Plays Over "Misty" |
| SC | Student3 | 04/01/2008 | Student3 Plays Over "Misty" |
| SC | Student4 | 02/07/2008 | Student4 Plays "Misty" |
| SC | Student5 | 12/12/2007 | Student5 Plays "Misty" |

ALL THE THINGS YOU ARE

| | Student Name | Date Posted | Description |
|---|---|---|---|
| SC | Student6 | 04/04/2008 | Student6 Plays Over "All The Things You Are" |
| SC | Student7 | 04/04/2008 | Student7 Plays Over "All The Things You Are" |
| SC | Student8 | 04/01/2008 | Student8 Plays Over "All The Things You Are" |
| SC | Student9 | 02/07/2008 | Student9 Plays "All The Things You Are" |

*FIG. 4*

Assessment Form Generator
(Create an Assessment Form for each Topic)

Master Class Type: [Five Shapes ⇕] (Go!)
Eval 1: It is important that you keep your fingers close to the fretboard. Your finger height
Answer 1: is excellent.
Answer 2: is good.
Answer 3: is OK.
Answer 4: needs a bit of improvement.
Answer 5: needs a lot of improvement.
    Remedials:
      [Lesson ⇕] URL: _____
      [Lesson ⇕] URL: _____
      [Lesson ⇕] URL: _____
      [Lesson ⇕] URL: _____
      [Lesson ⇕] URL: _____
      [Lesson ⇕] URL: _____

Eval 2: I was watching and listening for how fluid you are going from note to note, and it
Answer 1: is excellent.
Answer 2: is good.
Answer 3: is pretty good.
Answer 4: needs a little improvement.
Answer 5: needs quite a bit of work.
    Remedials:
      [Lesson ⇕] URL: _____
      [Lesson ⇕] URL: _____
      [Lesson ⇕] URL: _____
      [Lesson ⇕] URL: _____
      [Lesson ⇕] URL: _____
      [Lesson ⇕] URL: _____

Eval 3: Your accuracy as to which fingers you used
Answer 1: was perfect.
Answer 2: was pretty good.
Answer 3: was good, but you missed a few. You need to be 100% accurate.
Answer 4: was wrong...you need to be much more precise, it's important.
Answer 5:

*FIG. 5*     ↖ 40

Student A does a Five Shapes Test (07/14/2008)
| Master Class Home |  Previous Master Class |
| Student Center Home | Student A's Previous Master Class |
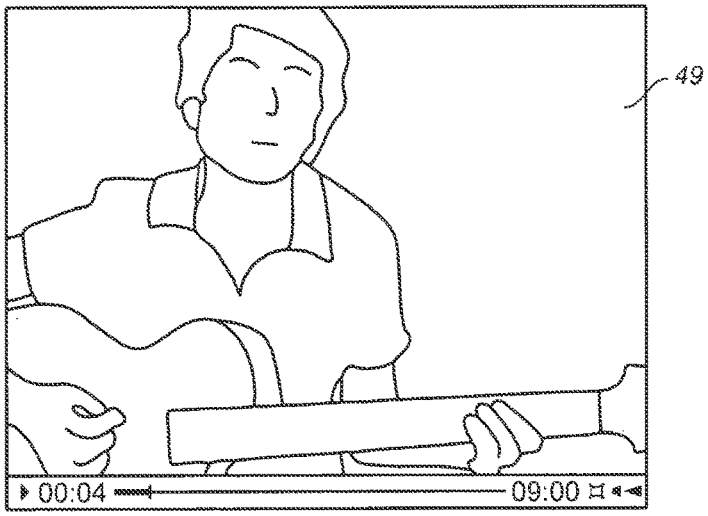
— 49
▶ 00:04 ━━━━━━━━━━━━━━ 09:00
Instructor's Comments
It is important that you keep your fingers close to the fretboard.
Your finger height is excellent... See The 5 Shapes - All positions, All Keys...
*FIG. 7*

Student A Plays the Five Shapes (07/08/2008)
Master Class Home | Previous Master Class
Student Center Home
Student A (USA)
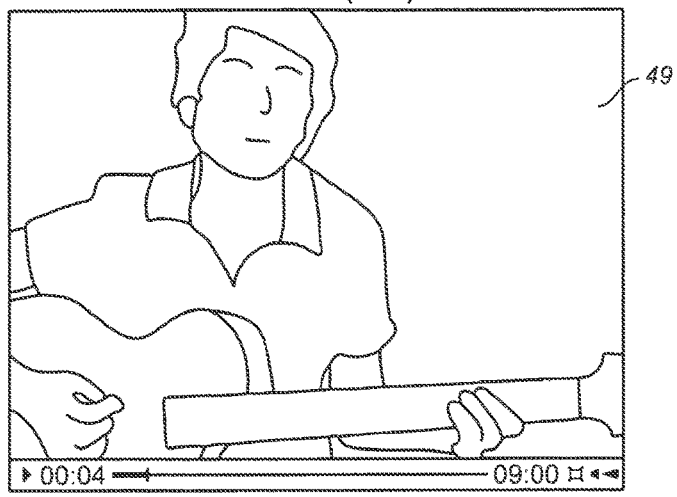
Instructor's Response
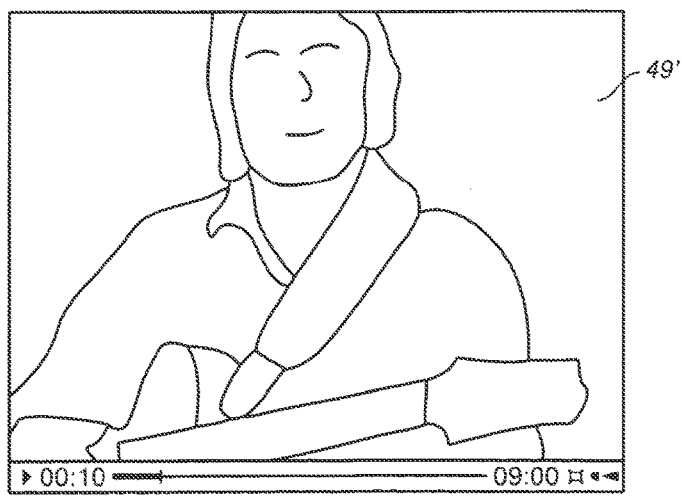
*FIG. 8*

VIDEO MANAGEMENT SYSTEM FOR INTERACTIVE ONLINE INSTRUCTION

CROSS-REFERENCES TO RELATED APPLICATIONS

This application is a Continuation of U.S. patent application Ser. No. 12/237,263 filed Sep. 24, 2008, entitled INSTRUCTIONAL SUBSCRIPTION WEBSITE AND VIDEO MANAGEMENT SYSTEM FOR INTERACTIVE ONLINE INSTRUCTION, which claims priority to U.S. Provisional Patent Application No. 61/083,902 filed Jul. 25, 2008, entitled INSTRUCTIONAL SUBSCRIPTION WEBSITE AND VIDEO MANAGEMENT SYSTEM FOR INTERACTIVE ONLINE INSTRUCTION, the entire contents of which applications are incorporated herein for all purposes by this reference.

BACKGROUND OF THE INVENTION

Field of the Invention

This invention relates, in general, to an instructional subscription website and video management system for interactive online instruction and methods for their use.

Description of Related Art

Personal instruction such as private guitar lessons can be relatively expensive, and when given by a master musician may be quite expensive. Group lessons are generally less expensive. With few exceptions, however, the amount of feedback a particular student receives from the instructor in a group is more limited as opposed to private lessons.

The "Master Class" approach is an alternative by which an instructor teaches an "evaluated student" in front of an audience of other students who passively observe the interaction between the instructor and the evaluated student. The audience of other students learn from the instructor feedback given to the evaluated student. In this Master Class approach, the evaluated student receives more feedback from the instructor relative to that given in group lessons, and at a lower cost than private lessons, namely because the expense of private lessons is subsidized by the presence of the other students. Master Classes, however, may be few and far between, limited by the relative scarcity of master musicians and/or geographically prohibited.

Online instructional methods are known. The amount of human feedback, however, is quite limited. Moreover, certain instruction requires the instructor to watch the student perform, for example, playing a guitar, swinging a golf club, performing comedy, acting, and other like activities. Lack of instruction may result in uncorrected bad habits. The difficulties of handling vast video content, and the limitations thereof complicate the matter.

It would therefore be useful to provide an instructional subscription website and video management system for interactive online instruction which overcome the above and other disadvantages of known instructional methods.

BRIEF SUMMARY OF THE INVENTION

One aspect of the present invention is directed to a method for interactive online instruction including the steps: providing prerecorded course materials on an instructional subscription website including video lessons accessible by subscribing students; and providing a video management system configured to process video recordings including (i) student videos submitted by a student and (ii) instructor videos providing feedback to said student videos.

The providing step may include providing prerecorded course materials which invite students to upload student videos. The method may further include uploading a student video to the video management system. The method may further include uploading a student video directly to the video management system via the Internet. The method may further include uploading a student video to the video management system with an applet saved to a student's computer and cooperating with a student's browser. The method may further include prior to uploading the student video, downloading the applet and saving the applet to the student's computer in order to facilitate uploading of said student video directly to the video management system.

The method may further include automatically transcoding the student video by the video management system and queuing the student video for review by an instructor. The method may further include evaluating the student video by the instructor and providing feedback to the student. The method may further include automatically providing an assessment form to be completed by the instructor for evaluating the student. The method may further include completing the assessment form evaluating the student video to provide feedback to the student.

Completing the assessment form may include providing a written response from the instructor regarding the student video. Alternatively it may include providing a response video from the instructor regarding the student video.

The method may further include automatically indexing the response video on a student's private webpage provided within the instructional subscription website. The method may further include selectively indexing the response video on a community public webpage provided within the instructional subscription website. The method may further include selectively indexing the student video on a community public webpage provided within the instructional subscription website.

Another aspect of the present invention is directed to a system for interactive online instruction including: an instructional subscription website including prerecorded video lessons accessible by subscribing students; and a video management system configured to process video recordings including (i) student videos uploaded by a student and (ii) instructor videos providing feedback to said student videos.

The instructional subscription website may include prerecorded course materials which invite students to upload student videos. The system may further include an application for uploading a student video directly to the video management system via the Internet. The system may further include an applet for uploading a student video to the video management system, wherein the applet may be saved to a student's computer and cooperates with a student's browser.

The instructional subscription website may include an applet for downloading and saving to the student's computer in order to facilitate uploading of said student video directly to the video management system. The video management system may automatically transcode the student video and may queue the student video for review by an instructor.

The system may further include an assessment form to be completed by the instructor for evaluating the student video and providing feedback to the student. The assessment form may include a written response section including (i) predetermined written feedback and/or (ii) blank fields for providing custom generated written feedback. The assessment form may include a video response section allowing the instructor to upload a video response to the instructional subscription website.

The system may further include a student's private webpage provided within the instructional subscription website, wherein the response video may be automatically indexed to the student's private webpage. The system may further include a community public webpage provided within the instructional subscription website, wherein the response video may be selectively indexed to the community public webpage.

The systems and methods of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 2 is a representation of a screen shot of a video submission page by which a student may upload videos to the video management system of FIG. 1.

FIG. 3 is a representation of a screen shot of a master class roster of the instructional subscription website of FIG. 1.

FIG. 4 is a representation of a screen shot of master class folders of the instructional subscription website of FIG. 1.

FIG. 5 is a representation of a screen shot of an assessment form generator of the instructional subscription website of FIG. 1.

FIG. 7 is a representation of a student's master class home page of the instructional subscription website of FIG. 1, the page including written feedback from the instructor.

FIG. 8 is a representation of a student's master class home page of the instructional subscription website of FIG. 1, the page including video feedback from the instructor.

DETAILED DESCRIPTION OF THE INVENTION

Figure 1:
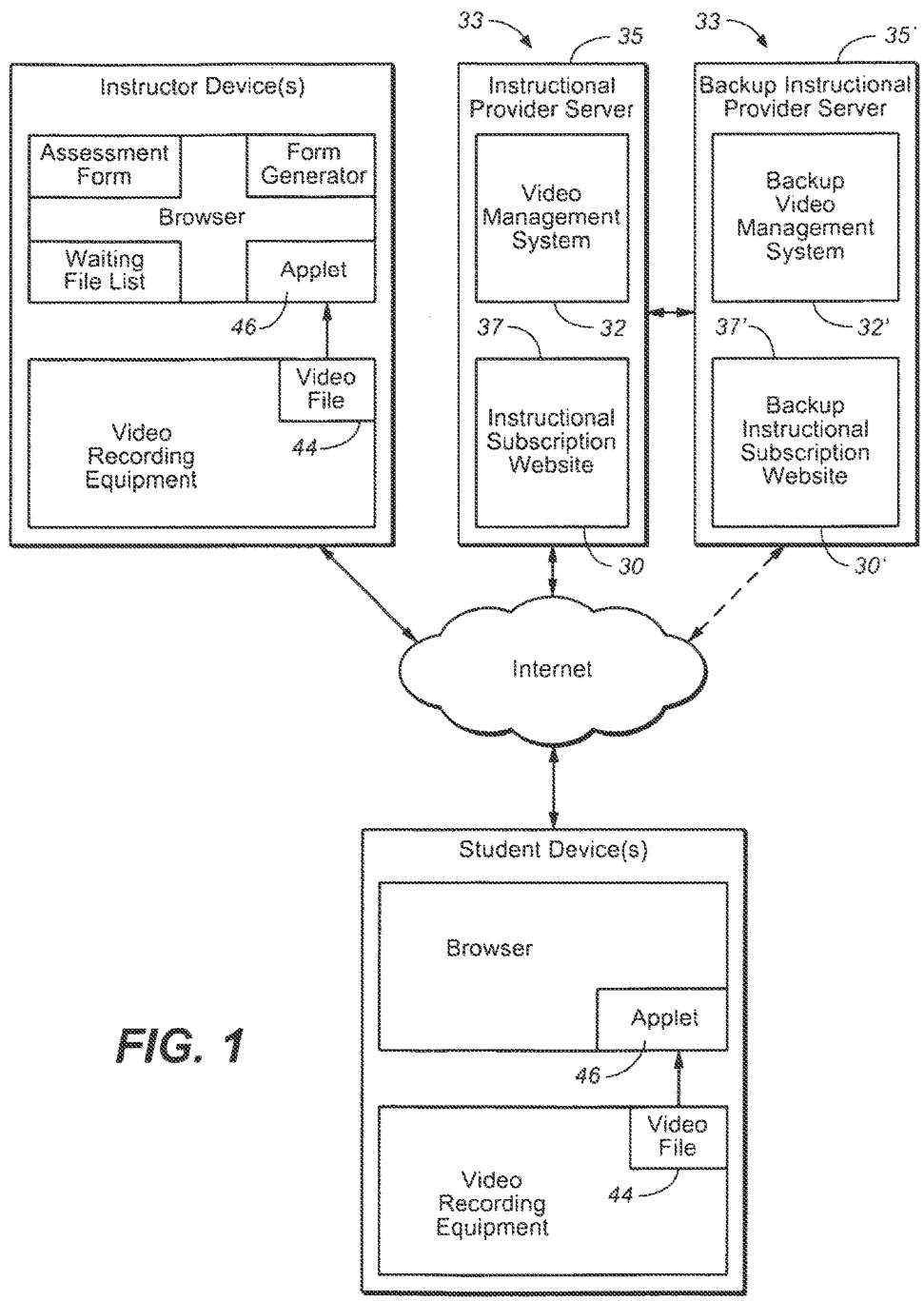
FIG. 1 is a block diagram representing an exemplary video management system and an instructional subscription website for interactive online instruction in accordance with various aspects of the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In one exemplary embodiment of the present invention, an instructional subscription website 30 and a supporting video management system 32 is provided by an educational provider or instructional institute 33, such as an institute, a partnership, a corporation, or the like. Preferably the instructional institute maintains one or more servers 35 to maintain the instructional subscription website and supporting video management system up and running. Preferable, one or more backup servers 35' are provided to increase system reliability and to prevent or minimize the possibility of service outages.

Preferably, the educational provider partners with top artists, instructors and/or other professionals to jointly create and profit from sustainable internet-based businesses. For example, one such educational provider is Affiliated Artists LLC which has partnered with renowned jazz-guitarist Jimmy Bruno to provide online music instruction through the Jimmy Bruno Guitar Institute (see, e.g., www.jimmybrunoguitarinstitute.com).

The educational provider may provide one or more instructional subscription websites 30, each being a personality-centric website specific to a notable person such as an artist, a musician, a comedian, a sports figure, and the like, all of whom may serve as an Instructor. Students subscribe to the website, paying a renewing subscription fee to learn from and be part of the aura of the Instructor and gain access to his or her instructional method and entertainment-oriented material. Another important element to subscribers is the intangible of being a part of a community that is oriented around the artist and his or her instructional method, and interacting with other members of that community.

The educational provider may partner with renowned individuals in various fields to serve as Instructors. In terms of prestige, the educational provider may decide that such partnerships are by invitation only, limiting such partnerships to well-known and respected artists, musicians, comedians, sports figures, and the like.

Once the partnership is created with an Instructor, the educational provider creates a instructional subscription website 30 for the Instructor. The instructional subscription website is preferably dedicated to a single Instructor, but one will appreciate that a single website may be created for a number of artists which may have similar backgrounds or styles (e.g., one website for a collection of blues guitarists, etc.). The educational provider provides the server technology, backend services, systems software, website design, billing and other "front office" business services. The Instructor provides course content and generally contributes to building an online community centered around the Instructor's field of expertise (e.g. jazz guitar).

The inner core of the instructional subscription website and its supporting video management system will now be discussed in detail.

Preparing the Instructional Content

Course Preparation and Video Lesson Recording

Once a general website shell 37, that is, a website having a relatively generic graphical user interface, is in place for the Instructor, he or she may outline the course materials, create content for the course materials, and/or prerecord a sequence of progressive video lessons. The lessons may be edited, uploaded to the website, and organized into a progressive curriculum (e.g., having one or more courses). The prerecorded lessons serve as the main "textbook" and course materials for the curriculum. As students enroll at various times, and at various skill-levels, the courses are designed to be self-paced by the individual students. A sufficiently populated website, that is, one having a number of progressive video lessons, will allow students to work at a wide range of skill-levels. Students may enroll and begin lessons at their appropriate skill level, and progress from there.

Establishing Interactive Elements

At various intervals during the recorded lessons, the Instructor may prescribe assignments to students reaching that point in the course materials. For example, at the end of a certain lesson, the student should be able to play a particular scale in the case of lessons for musical instruments. In the lesson video, the Instructor may instruct the student to make a short video of his or herself playing this scale. During the video, the Instructor may refer the student to a student video upload area of the website, for example, the Video Submission Page 39 illustrated in FIG. 2. The Video Submission page provides instructions to the student as to how to make the video, and provides an upload mechanism to upload the video for the Instructor (see "Student Video Submission" below). Once the video is uploaded, it is processed and placed in a waiting area for the Instructor.

Instructor Evaluation

In the Instructor's private viewing page on the site, he or she can watch the uploaded student videos at any time from anywhere provide that the Instructor has Internet access or other suitable access to the instructional subscription website. For example, the student videos may be provided to the Instructor as part of an evaluation page such as that shown in FIG. 6. The Instructor views each video (they are typically just a few minutes long). After watching the video, the Instructor creates a response to provide feedback to the student. The response can be via written assessment (see, e.g., FIG. 7), or via a "Response Video" (see, e.g., FIG. 8). Whichever it is, the student video is paired with the Instructor's response, creating site content for a "Master Class." Similar to "master classes" in which a particular "evaluated student" actively performs their lessons for the master musician in front of an audience of passive students. The submitted videos and the respective Instructor responses deepen the knowledge comprising the site content for all subscribing students.

In the present case, the Master Class content is posted not only to the individual student's private webpage(s), but may also be posted to web page(s) which are accessible to the entire community of subscribing students. As more and more of these Master Classes are posted, a deepening body of knowledge develops over time providing the students with an increasing volume of course content. The Master Class area, by design, may well become the most popular part of an instructional subscription website, as the Master Class area allows a particular student to review the progress of other students, and learn from the mistakes and achievements of other students. As such, the Master Class may provide the most "addictive" content of the instructional subscription website.

Assessment Forms

Preferably before an Instructional Institute opens, or before the instructional website of a particular Instructor goes live, the Instructor will want to prepare for incoming student videos once the lesson materials have been recorded. To make it easy and fast to respond to incoming student videos, the video management system of the present invention provides a "short hand" or simplified method to facilitate the Instructor in generating comprehensive written responses, and/or to record and post video responses. Timely personalized instruction may be critical to a positive learning outcome.

Figure 6:
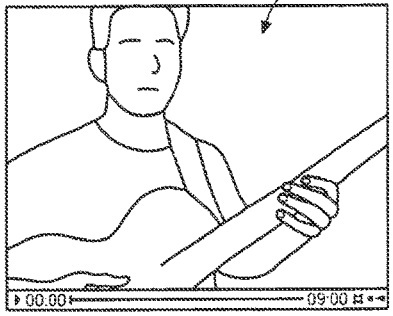
FIG. 6 is a representation of a screen shot of a student assessment generated from the assessment form generator of FIG. 5.

The Instructor may first generate a set of largely standardized assessment forms using the Assessment Form Generator 40, such as that shown in FIG. 5. Once the Instructor tailors his or her assessment form(s) to their methodology and style, the Instructor may prepare individual Assessment Forms 42 to reflect a series of evaluation parameters tailored by the Instructor to the respective course topics and/or skills, as shown in FIG. 6.

These Assessment Forms may be used as an Instructor views submitted student videos to efficiently capture the Instructor's opinion and comment, and quickly generate a comprehensive written evaluation and/or a written augmentation to the Instructor's Response video. This approach may enable the large number of responses necessary for a popular instructional web site.

Exemplary Assessment Forms may address various topics. In the case that the instructional website is a guitar instruction website, the Assessment Form may address: "The Scale Fingerings"; "Learning Chords in All Positions"; "How To Solo Over Chord Progressions"; etc.

For each Topic, the Instructor may create a set of specific assessment points for each topic. For example, specific assessment points pertaining to "The Scale Fingerings" may include:

"You are playing the Scale Fingering 'A'"
☐ at the right tempo
☐ at the wrong tempo
<remedial link to playing in correct tempo>.

Instructor also can optionally create a set of general assessment points that are needed regardless of online course topic. For example, general assessment points may include:

"You are generally"
☐ playing in tune
☐ not playing in tune
<remedial link to how to tune>.

Preferably, all Assessment Forms can be amended and/or extended by the Instructor at any time.

Video Management System

Student Upload Video

As generally discussed above, at various points in the online course material, the Instructor may assign a student the task of mastering a specific skill and/or assign a student a specific exercise (e.g., playing certain scales in the case of online guitar instruction). The Instructor may ask that the student submit a video demonstrating said skill or assignment. The students generally move through the course material at their own individual pace. When they encounter an assignment by the Instructor, the student may then endeavor to make, at their convenience, a video of themselves performing the assignment.

The student may use a webcam and appropriate video recording software to make a recording of him or herself for the Instructor's assessment. In the case of online guitar instruction, the student may simply video record themselves playing their guitar while seated before a webcam operably coupled to their computer. Students may video record themselves using generally available recording applications such as iMovie® and/or Quicktime® for users of Apple, Inc.'s Mac® products, Movie Maker for users of Microsoft, Inc.'s Windows® products, and/or other suitable means.

In various embodiments, once the video has been created, the student logs onto the instructional subscription website 30 and goes to the video submission page 39 shown in FIG. 2. Following the instructions set forth on the video submission page, the student provides information about the video, including such information as a title, the topic or category of the video, additional comments by the student, and/or other suitable and relevant information.

The final step for the student is to click "Submit Video" to transfer the video file to the appropriate instructional provider server 35, 35'. In some instances, the video file 44 created by the student may be uploaded via a software component that runs in the context of the student's browser such as an applet. For example, the student may download a browser applet 46 from instructional subscription website 30, and utilize the browser applet to upload the recorded video file 44 to the instructional provider's server(s). Alternatively, the instructional subscription website may include custom software to simplify such video recording and uploading. In one embodiment, the videos are transferred using a dedicated, proprietary process, however, one will appreciate that various suitable means may be utilized to do so.

Automatic Processing of Video Files

At the instructional provider's server, the video file is processed by the video management system 32. For example, the video file 44 may be transcoded (e.g., compressed, and put into appropriate web playback format). Once the transcoding is complete, the video is placed on the instructor's waiting videos list 47, viewable at any time by the Instructor via the Instructor's browser. Preferably, the transcoding of the video file is automatically processed by the video management system and automatically placed into the queue of the waiting videos list.

Preferably, the student may review the status of his or her uploaded video. For example, the video management system may be configured to inform the student how many videos are "ahead" of the presently submitted video thus giving the student a sense of how long he must wait for feedback from the Instructor. One will appreciate that videos submitted by other students, as well as videos previously submitted by said student, may be queued "ahead" of the student's presently submitted video.

Instructor Assessment

As noted above, the video management system is configured to allow the Instructor to view the student's videos at any time, and at any place provided that the Instructor has internet access or other suitable access to website 30 and/or system 32. Preferably the video management system is configured to allow the Instructor to view the waiting videos list via the Instructor's browser. Furthermore, the waiting videos list may be configured to show the Instructor all incoming videos, and at what stage each video is in the process (e.g., submitted, transcoded, queued, evaluation begun, evaluation saved, evaluation completed, etc.). The Instructor may selectively view the processed videos, and then evaluate and provide feedback to the student. The instructor may choose to evaluate more than one video together if on the same topic.

Once the instructor has selected the video or videos to evaluate, the student's video(s) is presented on a web page with the appropriate Assessment Form 42 as shown in FIG. 6. As discussed above, the Assessment Form may be tailored to a particular instructor's skills, style and/or methods. Preferably, a number of Assessment Forms may be pre-generated to correspond to various lessons and categories. For example, depending upon how the student categorizes their video submission, an Assessment Form specifically tailored to a particular lesson or exercise may be automatically paired with the video submission(s).

At this time, the Instructor watches the student's video submission(s). For example, the Instructor may open view the video submission(s) 49 along with the paired Assessment Form 42 in a manner similar to that which is illustrated in FIG. 6.

After viewing the video, the Instructor may elect to respond to the student's video with:
 a) written assessment only;
 b) written assessment and video assessment; or
 c) video assessment only.

If the Instructor is doing a written assessment, he simply fills out the Assessment Form. For example, the Instructor may check the appropriate comment (e.g., "Your left hand was . . . generally too far from the fretboard") or may include other comments inserted in an empty comment field 51, if so provided as shown in FIG. 6. The assessment form may also include the ability to direct the student to remedial materials, and otherwise tell the student what to do next. For example, the Instructor may check one of boxes instructing the student to "Work on: Play Five Shapes in all keys" (see FIG. 6).

If the Instructor wishes to prepare a Response Video, he or she may record a response video using appropriate video recording software to create a response video file. Once the response video file has been created, the Instructor may select the appropriate response video file at this time by clicking the "Choose File". Preferably, the video management system is configured to automatically upload the instructor's response video to the instructional provider's server(s).

When the response video and/or written assessment are complete, the Instructor selects "Publish Student Video". In doing so, the video management system preferably produces "Master Class" content, that is, creates a web page showing the student's video(s), the optional Instructor's Response Video, the written assessment, remedial links, and "what to do next" and/or other pertinent information, as shown in FIG. 7 and FIG. 8.

In some embodiments, the Master Class is automatically added to the appropriate Master Class topic or lesson folder (e.g., added to a "Five Shapes" web page) and/or to a Student Center area (e.g., Student A's videos web page). These folders and web pages may be private to the individual student, or the folders and web pages may be configured to be open to some or all subscribing students. Preferably the Student is notified upon login that the Instructor has responded to his video submission.

At the Instructor's option, the Master Class can be also be added as auxiliary content to support a core lesson area, which content would be accessible to all subscribing students. As such, the vast amounts of content may be generated that would be available to all subscribers.

Generating Community Content

The instructional website may include a "Member Login Page" that is viewed just after login. Preferably the Member Login Page includes a list of Master Classes that is updated to inform the online community of new Master Class videos that are available. A discussion topic for the particular Master Class may be automatically generated, thus providing a venue for other students to comment on the Master Class. As such, vast amounts of additional content may be generated directly by the students, thereby deepening the site's content.

In various embodiments, the Master Class can be designated by the Instructor as viewable by:
 1. The submitting student only (private lesson);
 2. Members only (usual case);
 3. Members and Public (for promotional purposes); and/or
 4. Not viewable (hidden, but still there).

The Master Class visibility status can be changed at anytime by the Instructor, and the Master Class can be deleted completely from the system.

Turning to the issue of reliability, keeping video websites running 24/7 is challenging and problematic. The introduction of massive numbers of videos stresses the servers. The conventional approach of buying enough server space on a single highly reliable web server may be insufficient to reliably maintain the "video heavy" instructional subscription website of the present invention. For example, a web site owner may not be able to afford to buy enough storage space and bandwidth to accommodate an ever-expanding number of videos.

As noted above, one or more backup servers may be provided to promote reliability and keep the instructional subscription website of the present invention running 24/7. In various embodiments, the video management system may use a "redundancy" approach, rather than a "reliability" approach. For example, it may be designed such that the entire video repository is mirrored.

And for handling very large amounts of video data, the system may be configured to use a "distribution" approach rather than a "single mega-server" approach. Such an approach allows for the videos to be distributed across as many servers as is necessary to take advantage of low cost servers. In other words the system may have:

A Primary Video Repository
Videos_A-K
Videos_L-Z;
Mirror (Backup Video Repository); and
BackupVideos_A-K
BackupVideos_L-Z.

Once configured, the mirroring may be automatic, and transparent to the Instructor and the students. The site appears to be one "virtual" server to both the Instructor and the Students. The reliability is achieved in the idea that it is unlikely that both servers, when geographically separated, will BOTH become inoperable at the same time. If the primary video repository (or "bank" of servers comprising the primary video repository) goes down, it is possible with a single command to switch to the backup video repository. One will appreciate that the switchover may be triggered by a webmaster issuing a command, or a monitoring system may be implemented that will "watch" the primary video site, and if it fails, automatically switch to the mirrored site.

On a day-to-day basis, at a certain time of the day, every day, the video management system may run a process that synchronizes the backup video repository and the contents of the primary video repository. This means, essentially, that any new videos that were added during the day to the primary video repository are automatically copied to the mirror video repository.

Such an approach provides an efficient and cost effective means of backup as it may result in about a 25× cost savings. For example, it presently costs approximately $800 to $900 per month for the necessary level of reliability and storage space to store hundreds of videos with a conventional single-server approach. Utilizing the above approach may reduce the overall costs to approximately $30 per month, as only two $15 per month server sites need be maintained, one is primary, the other is the backup.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for interactive online instruction by an educational provider comprising:
   an instructional website provided by the educational provider, the instructional website including prerecorded video lessons accessible by a plurality of students;
   one or more community webpages within the instructional website accessible by one or more of the plurality of the students; and
   a video management system provided on a server to process video recordings including student videos submitted by one or more of the plurality of students and including response videos providing feedback to said submitted student videos, wherein the video management system:
   receives, at the server, one or more submitted student videos,
   queues, at the server, the submitted student videos for review,
   facilitates uploading, to the server, the response videos, and
   provides an instructor's private webpage to facilitate (i) instructor review of one or more submitted student videos and (ii) selectively posting a respective one of the submitted student videos and a respective one of the response videos to one or more of the community webpages accessible by one or more of the plurality of students;
   wherein the video management system includes an assessment form generator that facilitates a reviewer to prepare an evaluation page; and
   wherein the video management system facilitates selective posting of one or more of the submitted student videos together with one or more of the response videos to one of the community webpages using a publish-student-video button provided on the evaluation page.

2. A system for interactive online instruction by an educational provider comprising:
   an instructional website provided by the educational provider, the instructional website including prerecorded video lessons accessible by a plurality of students;
   one or more community webpages within the instructional website accessible by one or more of the plurality of the students; and
   a video management system provided on a server to process video recordings including student videos submitted by one or more of the plurality of students and including response videos providing feedback to said submitted student videos, wherein the video management system:
   receives, at the server, one or more submitted student videos,
   queues, at the server, the submitted student videos for review,
   facilitates uploading, to the server, the response videos, and
   provides an instructor's private webpage to facilitate (i) instructor review of one or more submitted student videos and (ii) selectively posting a respective one of the submitted student videos and a respective one of the response videos to one or more of the community webpages accessible by one or more of the plurality of students;
   wherein the video management system includes an assessment form generator that facilitates a reviewer to prepare an evaluation page; and
   wherein the evaluation page selectively designates each submitted student video as viewable by (1) only the submitting student, (2) only the plurality of students, or (3) the plurality of students and the general public.

3. A method for interactive online instruction by an educational provider comprising:
  providing prerecorded video lessons on an instructional website provided by the educational provider, the instructional website including one or more community webpages accessible by a plurality of students;
  providing a video management system, on a server, to process video recordings including student videos submitted by one or more of the plurality of students and including response videos providing feedback to said submitted student videos, wherein the video management system:
  receives, at the server, one or more submitted student videos,
  queues, at the server, the submitted student videos for review,
  facilitates uploading, to the server, the response videos, and
  provides an instructor's private webpage to facilitate (i) instructor review of one or more submitted student videos and (ii) selectively posting a respective one of the submitted student videos and a respective one of the response videos to one or more community webpages accessible by one or more of the plurality of students.

4. A method according to claim 3, further comprising pairing the respective one of the submitted student videos and the respective one of the response videos so that the respective videos are displayed always together on one of the one or more community webpages.

5. A method according to claim 3 wherein, the video management system allows an instructor to (i) review the submitted student videos and (ii) selectively post the one or more of the submitted student videos together with a response video prepared by the instructor.

6. A method according to claim 3 wherein, the video management system includes an assessment form generator that facilitates a reviewer to prepare an evaluation page.

7. A method according to claim 6 wherein, the evaluation page facilitates a reviewer to (i) select a respective one of the submitted student videos and (ii) upload a corresponding response video.

8. A method according to claim 6, further comprising selectively posting one or more of the submitted student videos together with one or more of the response videos to said one of the community webpages using a publish-student-video button provided on the evaluation page.

9. A method according to claim 3, further comprising designating each submitted student video as viewable by (1) only the submitting student, (2) only the plurality of students, or (3) the plurality of students and the general public.

10. A method according to claim 3, further comprising organizing the prerecorded video lessons by course material topics, and queuing the submitted student videos for review by the course-material topics.

11. A method according to claim 3, further comprising submitting a student video to the video management system via the internet.

12. A method according to claim 3, further comprising generating a discussion topic to provide a venue for comments by one or more of the plurality of students.

* * * * *